March 13, 1934.    V. G. APPLE ET AL    1,950,962
ELECTRIC BOOSTER MECHANISM
Filed June 12, 1930    2 Sheets-Sheet 1

INVENTORS
Vincent G. Apple and
Henry D. Hukill
BY
Burton & McConkey
ATTORNEYS

March 13, 1934. V. G. APPLE ET AL 1,950,962
ELECTRIC BOOSTER MECHANISM
Filed June 12, 1930 2 Sheets-Sheet 2
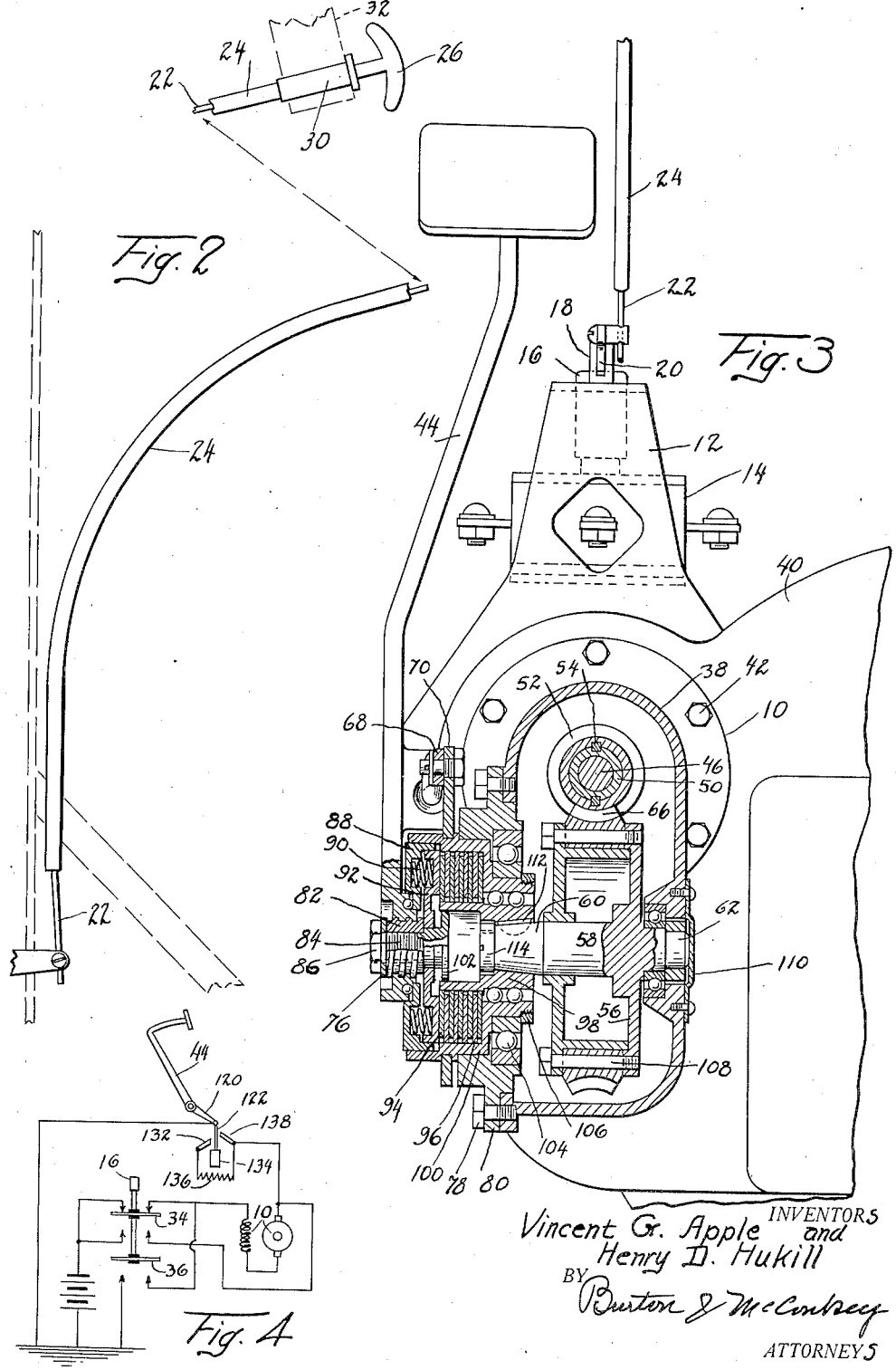
INVENTORS
Vincent G. Apple and
Henry D. Hukill
BY Burton & McConkey
ATTORNEYS Patented Mar. 13, 1934

1,950,962

UNITED STATES PATENT OFFICE 1,950,962

ELECTRIC BOOSTER MECHANISM

Vincent G. Apple, Dayton, Ohio, and Henry D. Hukill, South Bend, Ind., assignors to Bendix Brake Company, South Bend, Ind., a corporation of Illinois Application June 12, 1930, Serial No. 460,725

12 Claims. (Cl. 188—156)

Our invention relates to automotive vehicle brakes and has particular reference to an electric booster mechanism therefor.

An object of our invention is to increase the force transmitted to the brakes of an automotive vehicle in proportion to the manual effort exerted on the brake pedal. More specifically, we contemplate the use of an electric motor to provide power to assist in actuating the brakes, and a feature of our invention resides in the fact that we have devised means whereby the electric starting motor may be utilized for that purpose.

Still a further object of our invention is to permit the gradual application of the power provided by the electric motor and for this purpose we have utilized an improved coupling between the brakes and the electric motor which may be controlled by operation of the brake pedal.

Systems somewhat similar to that outlined above have been devised heretofore, but we further improve upon the general idea by providing means whereby the above specified coupling, preferably a friction disc coupling as illustrated, may be regulated to transmit any desired amount of power from the motor to the brakes simply by gradually depressing the brake pedal.

The friction disc coupling illustrated herein does not necessarily involve novelty as such, but permits a decided improvement in operation of booster mechanisms powered by rotating shafts, as for instance, by the electric motor illustrated.

Moreover, the fact that depression of the brake pedal increases the friction between the clutch discs to a predetermined maximum, while permitting any desired slippage, and simultaneously actuates the brakes through mechanical linkage is a factor of importance.

Various other objects and meritorious features of our invention will be apparent from the following description wherein:

Fig. 2 is an enlarged view of the electric starting motor switch control,

Fig. 3 is a section through line 3—3 of Fig. 1, and

Fig. 4 is a circuit diagram illustrating the operation of the mechanisms.

Figure 1:
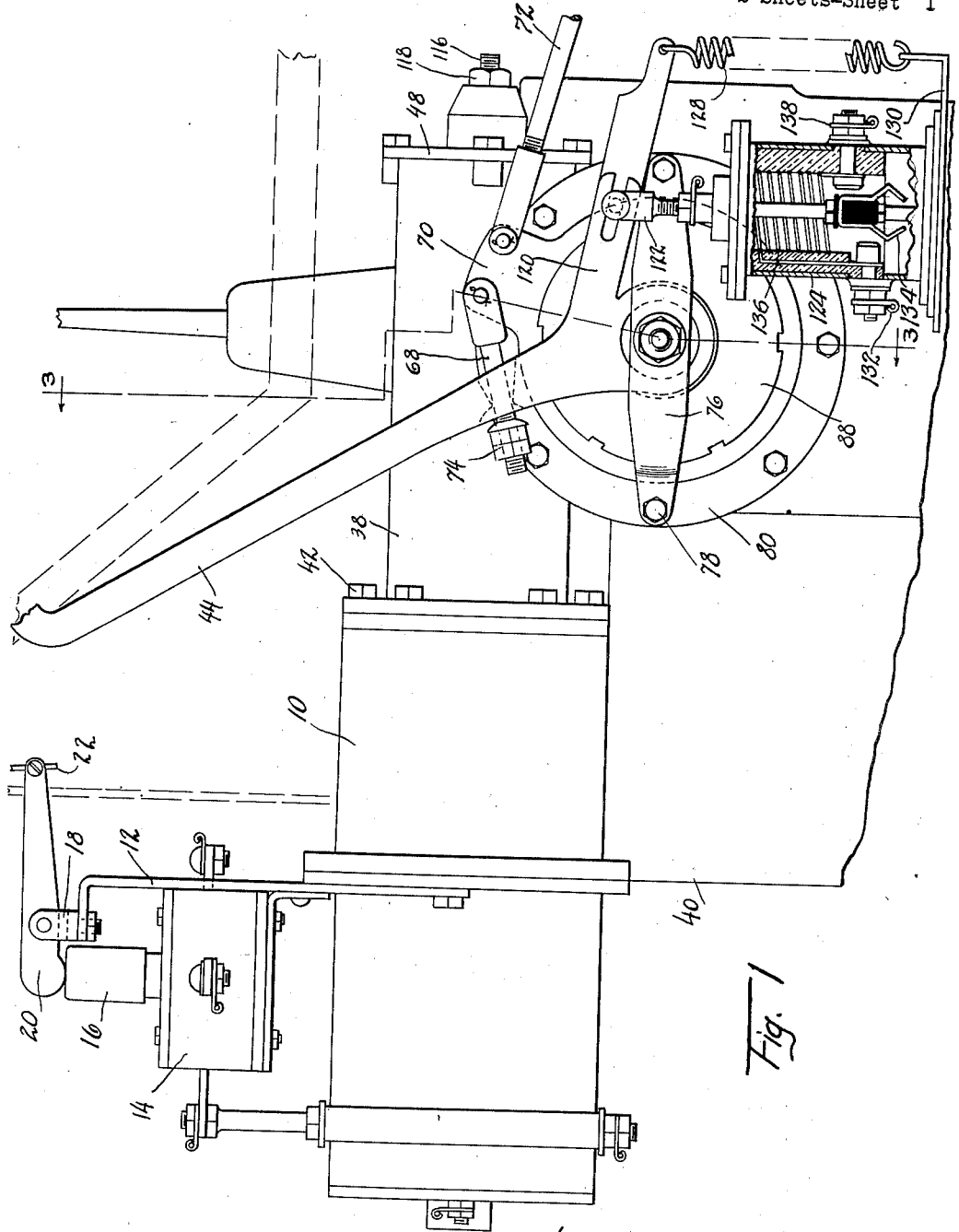
Fig. 1 is a side elevation of my improved coupling mechanism.

Secured to any convenient portion of the vehicle chassis is the electric starting motor 10. This motor is reversible for purposes to be hereinafter described. Secured to the motor, as by means of a bracket 12 is an electric switch 14 which is provided with a depressible stem 16 which operates to make and break the contacts as clearly illustrated in Fig. 4. Pivoted to a lug 18 secured to bracket 12 is a lever arm 20, one end of which is designed to bear on stem 16 and the other secured to a flexible rod 22 which extends through a flexible guide cable 24. A pull handle 26 extends through a sleeve 30 inserted in the dash board 32 of the vehicle body and is secured to the upper extremity of rod 22. Thus it is obvious that the pulling out and pushing in of handle 26 functions to close and open the contacts of switch 14 by depression of stem 16. The normal position of the switch blades 34 and 36 are clearly illustrated in Fig. 4. In this position a circuit may be completed through the electric motor 10 in one direction for purposes hereafter to be described. On depression of stem 16 when the handle 26 is pulled out a reverse circuit is closed through the motor, as may be readily seen from the circuit diagram of Fig. 4.

When the electric motor 10 is running in the direction which results from depression of stem 16 it functions in a manner clearly described and illustrated in detail in my copending application Serial No. 336,298, filed January 30, 1929, Patent No. 1,876,540, to crank the vehicle engine. A reduction gear housing 38 is secured to the fly wheel housing 40 of the vehicle engine by cap screws 42. This housing serves to enclose the reduction gear, multiple disc clutch, and lower extremity of brake pedal 44. The armature shaft 46 of electric motor 10 is extended and has its outer bearing in the end 48 of housing 38. An over-running clutch, illustrated and described in detail in my copending application above specified, is provided with a cam member the hub 50 of which is forced by way of the one way clutch action to rotate with armature shaft 46 when the latter is rotating in a direction opposite to that used for cranking the engine.

A worm gear 52 is splined to the hub 50 of the camming member, as at 54, and is thus free to slide axially along shaft 46 while at the same time being constrained to rotate therewith in one direction.

The bearing ends 60 and 62 of the worm wheel axle 58 are housed in opposite sides of the housing 38. The teeth 66 of the worm wheel 56 are adapted to engage the worm gear 52. The fact that the worm 52 may be slid axially along the armature shaft 46 of the electric motor permits the worm wheel 56 to be rotated without turning the said motor shaft. In this way the brakes may be manually applied when the booster mechanism is inoperative without rotating the motor shaft 46. A spring not shown, normally retains the worm and worm wheel in engagement with one another.

An overrunning adjustable tie rod 68 connects the clutch driven member 70 with the brake pedal 44 and an adjustable rod 72 connects the clutch driven member 70 with the brakes. In this way the brakes may be manually applied by depression of brake pedal 44 if the clutch mechanism hereinafter described should slip unduly or become inoperative.

A nut 74 on the threaded end of the tie rod 68 provides means for adjusting the relation between the clutch driven member 70 and the brake pedal 44.

A clutch engaging nut support bar 76 is held securely by two of the cap screws 78 which secure the reduction gear housing front bearing plate 80 to the housing. The clutch engaging nut 82 is machined with a coarse pitch thread fitted to a matching thread in the hub of brake pedal 44. The nut 82 is also threaded on the inside to mesh the threaded member 84 which is supported by the clutch engaging nut support bar 76. The nut 86 locks the bar 76 to nut 82, and the fact that brake pedal 44, nut 86, nut 114, and member 84 are threaded simply provides means to adjust for wear in the clutch parts and to fit the brake pedal for its most effective range of travel to transmit power from the motor to the brakes.

The clutch spring pressure plate 88 is pressed against the clutch springs 90 by the depression of the brake pedal 44 as it pivots with the nut 82, in this way bringing pressure to bear on the clutch disc bearing plate 92. This in turn presses against the clutch discs 94 and 96. The discs 94 are driving plates which are keyed to the member 98, and discs 96 are the driven discs which are keyed to the clutch driven member 100.

The drive member 98 and driven member 100 rotate relatively upon a double row ball bearing. The drive member 100 is secured to the main front bearing 104 by means of the holding nut 106. Ball bearing 104 supports the clutch assembly and also constitutes the front bearing for the worm gear 56. The cap screws 108 secure the gear teeth 66 to the rim of worm wheel 56.

The cover plate 110 provides for inspection of the bearing in which the rear end 62 of the worm wheel axle 58 is housed, rendering inspection without dismantling the unit possible. The clutch end 60 of worm wheel axle 58 is tapered to fit the driving member 98 and fitted with a key 112 to transmit driving torque thereto. The nut 114 holds the axle 58 and the clutch driving member 98 together.

Any end thrust which the electric motor drive shaft may develop is absorbed by the thrust adjustment screw 116, which is locked in place by the lock nut 118.

The lower extremity 120 of brake pedal 44 engages the plunger 122 of electric switch 124. An extension of this lower extremity of the brake pedal is carried beyond the reach of the booster switch connection to provide an attachment for the return spring 128 which is fast to the mounting platform 130 of the switch.

This switch may be of any of the well known types wherein a resistance unit is incorporated in the circuit which is made upon initial raising of plunger 122 and shunted out of circuit on subsequent additional raising thereof. Such a switch is illustrated diagrammatically in Fig. 4, constituting two brushes the first, 132, of which is contacted initially by switch plate 134 whereupon a circuit is made through resistance 136 and electric motor 10 for the purpose of rotating the motor in a direction to operate worm wheel 56 through the overrunning clutch and thus apply the brakes. On additional depression of brake pedal 44 the second brush 138 is contacted by switch blade 134 and resistance 136 is shunted out of the circuit. This permits the full power from the electric motor to be transmitted to the brakes.

It is apparent from the foregoing description that depression of brake pedal 44 cams in plate 88 of the clutch mechanism gradually to create corresponding increased friction between the clutch discs 94 and 96. This results in more and more power being transmitted from the electric motor 10 through the clutch mechanism to the brakes. In other words the power transmitted from the electric motor bears a direct ratio to the manual effort exerted upon the brake pedal 44.

Furthermore, it is obvious that the brakes may be applied manually on depression of brake pedal 44 through the linkage 68 and 72.

The adjusting means 74 permits simple regulation of the friction created in the clutch discs upon any predetermined depression of pedal 44. Various other modifications of our improved mechanism may be apparent to those skilled in the art and for that reason we intend to limit ourselves within the scope of the appended claims only.

We claim:

1. In combination with a brake actuating rod, power means, and a friction disc clutch adapted to couple the two, a brake pedal having a camming surface operative on depression of said pedal to engage the friction discs of said clutch, and mechanical linkage coupling said brake pedal and actuating rod, said linkage including means for adjusting the manual operation of the brakes.

2. Brake mechanism comprising an electric motor, a clutch disc driven thereby, a driven clutch disc, a brake actuating rod secured to said driven disc, a brake operating member secured to the same, and means responsive to the movement of said operating member to close an electric circuit to said motor and simultaneously engaging said friction discs, said means including means to successively lower the resistance in said circuit on continued movement of said member.

3. Brake mechanism including, in combination, an electric circuit having an electric motor incorporated therein, a brake actuating rod, a brake operating member mechanically coupled therewith, means automatically responsive to movement of said operating member to couple said motor and rod, an electric switch in said circuit, and means associated with said switch and coupled with said operating member for first closing said circuit and subsequently varying the resistance therein as the operating member is moved.

4. Brake mechanism comprising, an electric motor, a clutch element including interleaved driving and driven clutch discs, a driving connection between said motor and said driving clutch discs, a brake actuating means secured to said driven discs, a brake operating member adapted upon movement to gradually energize said motor and simultaneously engage said driving and driven discs thereby operatively connecting said motor with said brake actuating means.

5. Brake mechanism comprising, a power mechanism, brake actuating means, a shaft adapted to be driven from the power mechanism and carrying driving clutch discs mounted thereon, driven clutch discs interleaving with said driving clutch discs connected with said brake actuating means, a second shaft mounted in axial alignment with said first shaft carrying an axially movable clutch disc bearing plate, a brake operating member rotatively mounted on said second shaft, and means for axially moving said bearing plate against said clutch discs to engage the same upon rotation of the brake operating member whereby an operative connection is established between the power mechanism and the brake actuating means.

6. Brake mechanism comprising, a power operated device, brake actuating means, a pair of axially aligned shafts, a power driving connection between one of said shafts and the power operated device, driving clutch discs mounted on said power driven shaft, driven clutch discs interleaving with driving discs having an operative connection with said brake actuating means, a brake pedal rotatively mounted on said other shaft, camming means on said latter shaft adapted to move the brake pedal axially upon rotation thereof, and means associated with said pedal for engaging said driving and driven clutch discs upon axial movement of the pedal whereby an operative connection is established between the power operated device and the brake actuating means.

7. Brake mechanism comprising, a power operated device, brake actuating rod, a clutch mechanism between said device and rod including interleaved driving and driven clutch discs, a shaft mounted adjacent to said clutch mechanism, a manually operable member rotatively mounted on said shaft and adapted upon rotation thereof to move axially along the shaft, means adapted upon axial movement of said member to engage said driving and driven clutch discs, and means for manually actuating said brake actuating rod from said manually operable member upon failure of the power operated device.

8. Brake mechanism comprising, a power operated device, a brake actuating rod, a pair of axially aligned shafts, a driving connection between one of said shafts and the power operated device, clutch discs mounted axially along said power driven shaft, clutch discs interleaving with said first mentioned clutch discs and adapted to be driven thereby upon engagement of the discs, a connection between said second mentioned clutch discs and the brake actuating rod, a manually operable member rotatively mounted on said other shaft and adapted upon rotation thereof to move axially along said shaft, means interposed between said member and the clutch discs for engaging said clutch discs upon axial movement of the member, and means for regulating the delivery of power to said power operated device to operate the same upon rotation of said manually operable member.

9. Brake mechanism including, in combination, a power operated device, brake actuating means, a clutch mechanism between said power operated device and said brake actuating means, a manually operable member adapted upon movement in one direction to engage said clutch mechanism and simultaneously increase the delivery of power to the power operated device whereby the brake actuating means is operated from the power device with increasing force.

10. Brake mechanism including, in combination, a power operated mechanism, a variable power control device therefor, a shaft adapted to be driven from said power operated mechanism, brake actuating means operatively connected with said power driven shaft through a clutch device, a second shaft adjacent to the power driven shaft rotatively carrying a manually operable member, said member upon rotation thereof adapted to actuate the variable power control device and simultaneously gradually engage the clutch device whereby a variable power transmitting connection is established between the power operated mechanism and the brake actuating means.

11. Brake mechanism including, in combination, a power operated device, brake actuating mechanism, a manually operable member, a pair of control devices actuated by said member, one of said control devices adapted to vary the power delivered to the power operated device, and the other of said control devices adapted to vary the power delivered from the power device to the brake actuating mechanism.

12. Brake mechanism including, in combination, a power operated mechanism, brake actuating means adapted to be driven by said mechanism, a control device for varying the delivery of power to the power operated mechanism, a second control device for varying the delivery of power from said power operated mechanism to said brake actuating means, and a manually operable member adapted to actuate the control devices to thereby vary the power delivery to the brake actuating means.

VINCENT G. APPLE.
HENRY D. HUKILL.